March 26, 1974  O. WITNES ET AL  3,799,837
FLUTING AND CORRUGATED CARDBOARD CONTAINING SUCH FLUTING
Filed May 7, 1971

United States Patent Office 3,799,837
Patented Mar. 26, 1974

3,799,837
FLUTING AND CORRUGATED CARDBOARD
CONTAINING SUCH FLUTING
Odd Witnes, Sarpsborg, Norway, and Oivind Reidar Langaard, Saffle, Sweden, assignors to Billeruds Aktiebolag, Saffle, Sweden, and M. Peterson & Son A/S, Moss, Norway
Filed May 7, 1971, Ser. No. 141,187
Claims priority, application Sweden, May 22, 1970, 7,112/70
Int. Cl. B32b 3/28, 3/30
U.S. Cl. 161—135        5 Claims

ABSTRACT OF THE DISCLOSURE

Corrugated cardboard having a high rigidity in the wet state contains a fluting which consists of a laminated material. Said laminated material contains a core sheet having a weight of 50–150 g./m.$^2$ and a modulus of elasticity of at least 1000 N/mm.$^2$. The core sheet consists of a rigid plastics which retains its rigidity in the wet state. The core sheet has on both sides paper coatings having a weight of 10–50 g./m.$^2$.

---

Figure 1:
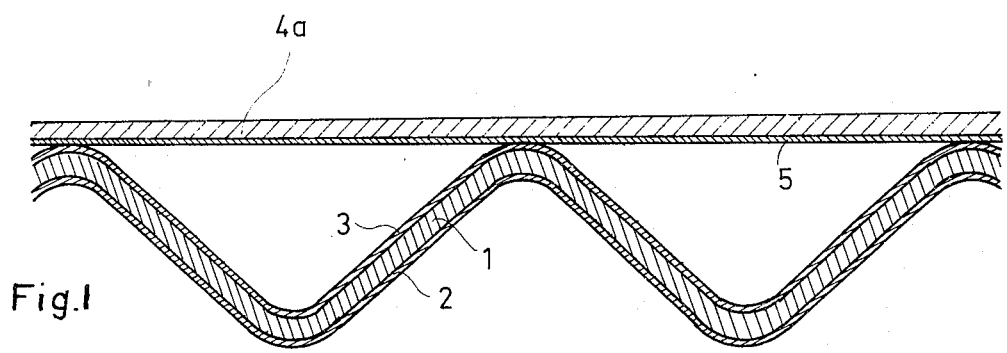

The invention is concerned with fluting, and with corrugted cardboard containing such fluting. The term corrugated cardboard is used in the following specification and claims to define a product consisting of a corrugated sheet adhesively bonded, on one or both sides, to a flat sheet. The term fluting is used to define said corrugated sheet, and the term lining is used to define said flat sheet.

The object of the invention is to provide a fluting and a corrugated cardboard having a high rigidity in the wet state. Preferably, said high rigidity should be of a permanent character, i.e. the fluting and the corrugated cardboard shall retain its high rigidity also after having been exposed to a wet environment for a long period of time. It is another object of the invention to provide a fluting which can readily be produced and corrugated, and which can readily be adhesively bonded to the lining or linings.

Corrugated cardboard is usually a superior material for rigid containers in a dry environment. In a moist environment, however, the paper will absorb water, and the rigidity will be lost. This is true both for the lining and for the fluting.

Many attempts have been made to increase the rigidity in the wet state. The lining has been impregnated with wax or other agents retarding the absorption of water. The lining layers have been coated with a plastic coating, or the corrugated cardboard has been coated with wax in a curtain coating operation. The term curtain coating is used here to define a method of applying a coating of wax upon the corrugated cardboard by spraying atomized wax upon the corrugated cardboard. The wax, for example paraffin wax, may be molten or dissolved in a solvent. Such a plastic or wax layer constitutes a barring layer protecting the paper against water and water vapor. Similar agents have been used on the fluting. Barring layers, for example plastic layers, upon the fluting have caused troubles because it has been difficult to corrugate a fluting of this type in conventional corrugating machines, and because a thin plastic surface layer is easily cracked in the corrugating operation, and the "pin holes" thus formed make the plastic layer permeable to water.

Various types of corrugated cardboard are known, being more or less rigid in the wet state, but none of them has a permanent rigidity in the wet state as far as the fluting is concerned. The fluting is mainly responsible for the rigidtiy of the corrugated cardboard. Therefore, it is important that a corrugated cardboard for a wet environment contains a fluting having a permanent rigidity in the wet state. The fluting of the invention comprises a core sheet having a weight of 50–150 g./m.$^2$ and consisting of a plastics having a modulus of elasticity of at least 1000 N/mm.$^2$, said core sheet having on both sides coatings of paper having a weight of 10–50 g./m.$^2$. By "N" is meant a "Newton" which latter, according to "Handbook of Chemistry and Physics" is equivalent to $10^5$ dynes.

The plastics forming the core sheet of the fluting may be a thermoplastics, such as high density polyethylene or, preferably, polystyrene. Alternatively, the plastics may be a thermosetting resin which has not yet been cured to the fully hardened state. The plastics must not give an undesired smell or taste to goods coming into contact with the corrugated cardboard. If combusted, the plastics shall not produce harmful combustion products.

The covering sheets of the fluting shall consist of a tight and thin paper, preferably kraft paper having a weight of 30–50 g./m.$^2$. The paper shall have a high strength in the wet state. This can be achieved, in a way known per se, by adding to the pulp 1% of alum, sulphuric acid in a quantity to give the pulp a pH value of 4–4.5, and 0.2% of tall oil resin, and finally, just before the pulp enters the paper making machine, 0.2% of urea formaldehyde of the cation active type. The percentages referred to are based upon the weight of solids in the pulp.

The laminated fluting is produced by heating the plastics sheet, or the covering sheets, or both, and passing them between compression rollers at a laminating pressure. The paper coatings prevent a direct contact between the plastics sheet and the rollers. Alternatively, the laminated fluting is produced by extruding the plastics sheet between two sheets or strips of paper. The laminated material thus produced is now corrugated in a way known per se, the paper coatings preventing a direct contact between the plastics sheet and the corrugating rollers. If the plastics is a thermosetting resin, the corrugated fluting is now exposed to a heat treatment so as to bring the plastics into the completely hardened state.

The fluting, thus produced, is now adhesively bonded, on one side or on both sides, to a lining. The lining is bonded to the apices of the corrugated fluting by heat sealing or by means of an adhesive having a high strength in the wet state.

The lining may consist of a sheet of a plastics, such as polystyrene. The plastics sheet may have a paper coating on one side or on both sides.

Alternatively, the lining may consist of a sheet of paper. In many cases it has been found useful to use a paper lining having a polyethylene coating. If desired, the lining may have been treated with wax. This lining may readily be adhesively bonded to the fluting by heat sealing. A final curtain coating with wax results in a good product having a high rigidity in the wet state. The lining may consist of waxed paper. In this case it is essential that the finished corrugated cardboard is exposed to a curtain coating with wax.

Figure 2:
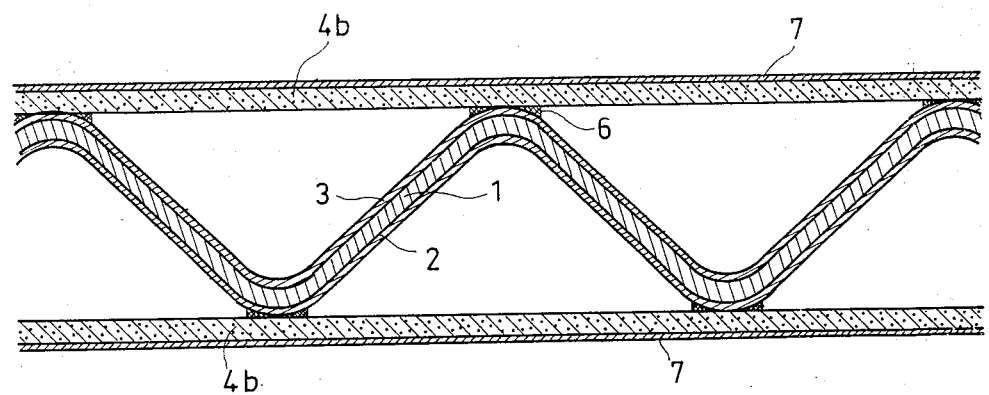

The invention will now be described with reference to the drawing. FIG. 1 illustrates a corrugated cardboard consisting of fluting bonded to one lining. FIG. 2 illustrates a corrugated cardboad consisting of fluting bonded to two linings.

In both figures the fluting consists of a core layer 1 of plastics, and surface layers 2 and 3 of machine-glazed paper having a high strength in the wet state. In FIG. 1 the liner consists of waxed paper 4a having a polyethylene coating 5 facing the fluting. The apices of the fluting and the lining are united by heat sealing. In FIG. 2 the liners consist of paper sheets 4b impregnated with wax. The apices of the fluting are united to the linings by means of an adhesive 6 having a high strength in the wet state.

The corrugated cardboard has finally been waxed in a curtain coating operation, resulting in wax coatings 7 on the outer surfaces of the linings.

EXAMPLE 1

For use as boxes for fish a fluting was manufactured containing machine-glazed paper having a weight of 40 g./m.$^2$, polystyrene having a weight of 125 g./m.$^2$, and machine-glazed paper having a weight of 40 g./m.$^2$. The fluting was a so-called B-flute, having a height or thickness of 3 mm. and containing 164 grooves per meter. The fluting was combined by heat sealing with two waxed paper linings having a weight of 240 g./m.$^2$ and covered with a polyethylene coating having a weight of 20 g./m.$^2$. The corrugated cardboard thus formed was exposed to a curtain coating with wax to form a product having a high rigidity in the wet state and having a weight of 850 g./m.$^2$. This product, after having been soaked with water, had the same Flat Crush Test value as a similar product tested in a dry environment, said similar product containing a fluting of the quality Billerud flute having a weight of 112 g./m.$^2$.

EXAMPLE 2

The fluting described in Example 1 was adhesively bonded to two linings consisting of kraft paper impregnated with wax and having a weight of 240 g./m.$^2$. The adhesive was a starch glue having a high strength in the wet state, and the product was subsequently exposed to a curtain coating with wax. The corrugated cardboard thus produced had a weight of 810 g./m.$^2$, and had, in the wet state, the same Flat Crush Test value as the product described in Example 1.

What is claimed is:

1. Fluting having a high rigidity in the wet state, comprising a core sheet having a weight of 50–150 g./m.$^2$ and consisting of a plastics having a modulus of elasticity of at least 1000 N/mm.$^2$, said core sheet having on both sides coatings of paper having a weight of 10–50 g./m.$^2$.

2. Fluting as claimed in claim 1, in which the plastics core sheet has a weight of approximately 125 g./m.$^2$ and the paper coatings consist of kraft paper having a weight of approximately 40 g./m.$^2$.

3. Fluting as claimed in claim 1, in which the paper coatings contain additives increasing the strength in the wet state.

4. Corrugated cardboard having a high rigidity in the wet state, comprising fluting as claimed in claim 1 and a lining adhesively bonded to at least one side of said fluting.

5. Corrugated cardboard as claimed in claim 4, in which the lining consists of a paper sheet having a coating of plastics on the side facing the fluting, the lining being united to the fluting by heat sealing.

References Cited

UNITED STATES PATENTS

| | | | |
|---|---|---|---|
| 3,616,010 | 10/1971 | Dunholter et al. | 161—137 XR |
| 3,307,994 | 3/1967 | Scott | 161—137 XR |
| 3,033,708 | 5/1962 | McKee | 156—210 XR |
| 3,308,006 | 3/1967 | Kresse et al. | 156—210 XR |

WILLIAM A. POWELL, Primary Examiner

U.S. Cl. X.R.

156—210; 161—137